US007156049B2

(12) United States Patent
Evans et al.

(10) Patent No.: US 7,156,049 B2
(45) Date of Patent: Jan. 2, 2007

(54) RELEASE MECHANISM TO INTERACT WITH BIOTA, IN PARTICULAR FAUNA THAT MAY OUTGROW AVAILABLE HABITAT

(75) Inventors: James A. Evans, Tallulah, LA (US); James P. Kirk, Vicksburg, MS (US); Leandro E. Miranda, Starkville, MS (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 85 days.

(21) Appl. No.: 10/943,646

(22) Filed: Sep. 10, 2004

(65) Prior Publication Data

US 2006/0054097 A1    Mar. 16, 2006

(51) Int. Cl.
*A01K 29/00* (2006.01)
*A61B 19/00* (2006.01)
*A61K 9/22* (2006.01)

(52) U.S. Cl. .................... 119/174; 119/215; 119/650; 119/651; 128/899; 604/891.1; 43/4; 43/124; 424/424

(58) Field of Classification Search ............... 119/215, 119/174, 231, 219; 43/4.5, 124; 102/276, 102/202.14, 202.5; 604/891.1; 600/12; 607/120; 606/117; 128/899
See application file for complete search history.

(56) References Cited

U.S. PATENT DOCUMENTS

| | | | |
|---|---|---|---|
| 2,884,356 A | 4/1959 | Starr et al. | |
| 3,152,953 A | 10/1964 | Strong et al. | |
| 3,389,685 A | 6/1968 | MacPhee et al. | |
| 3,602,194 A | 8/1971 | Marking | |
| 3,765,414 A * | 10/1973 | Arlen | 424/424 |
| 4,174,406 A | 11/1979 | Bordenca et al. | |
| 4,217,826 A * | 8/1980 | Young et al. | 102/200 |
| 4,221,782 A | 9/1980 | MacPhee et al. | |
| 4,372,239 A * | 2/1983 | Hagelberg et al. | 114/20.2 |
| 4,395,969 A | 8/1983 | Cheng et al. | |
| 4,930,421 A * | 6/1990 | Macdonald | 102/377 |
| 5,318,557 A * | 6/1994 | Gross | 604/891.1 |
| 5,460,093 A * | 10/1995 | Prinz et al. | 102/217 |
| 5,674,518 A | 10/1997 | Fajt | |
| 5,984,875 A * | 11/1999 | Brune | 600/549 |
| 6,012,415 A * | 1/2000 | Linseth | 119/174 |
| 6,099,482 A * | 8/2000 | Brune et al. | 600/549 |
| 6,622,629 B1 * | 9/2003 | Hodge et al. | 102/235 |
| 6,776,165 B1 * | 8/2004 | Jin | 128/899 |
| 6,976,982 B1 * | 12/2005 | Santini et al. | 604/891.1 |

(Continued)

*Primary Examiner*—Teri Pham Luu
*Assistant Examiner*—Joshua Michener
(74) *Attorney, Agent, or Firm*—Earl H Baugher, Jr.

(57) ABSTRACT

A device for interacting with biota either on a pre-specified schedule or via actuation by remote signal. Preferably, the biota are fauna and more particularly fish. In selected embodiments, it comprises frangible packaging enclosing means for timing interaction, at least part of the means for programming the device and means for opening the packaging. In select embodiments of the present invention, the apparatus is inserted in fish. Specific examples of the present invention are implanted in triploid grass carp (*Ctenopharyngodon idella*) to facilitate control of aquatic weeds in bodies of water. When the carp have been in the water for a pre-specified period or, alternatively, long enough to effectively control the target aquatic plants, toxins in the device are dispensed to kill them. Otherwise, the carp may destroy all vegetation and harm the aquatic environment for other aquatic life.

6 Claims, 3 Drawing Sheets

U.S. PATENT DOCUMENTS

2003/0213495 A1* 11/2003 Fujita et al. ................ 128/899

2004/0121486 A1* 6/2004 Uhland et al. .............. 436/174

* cited by examiner

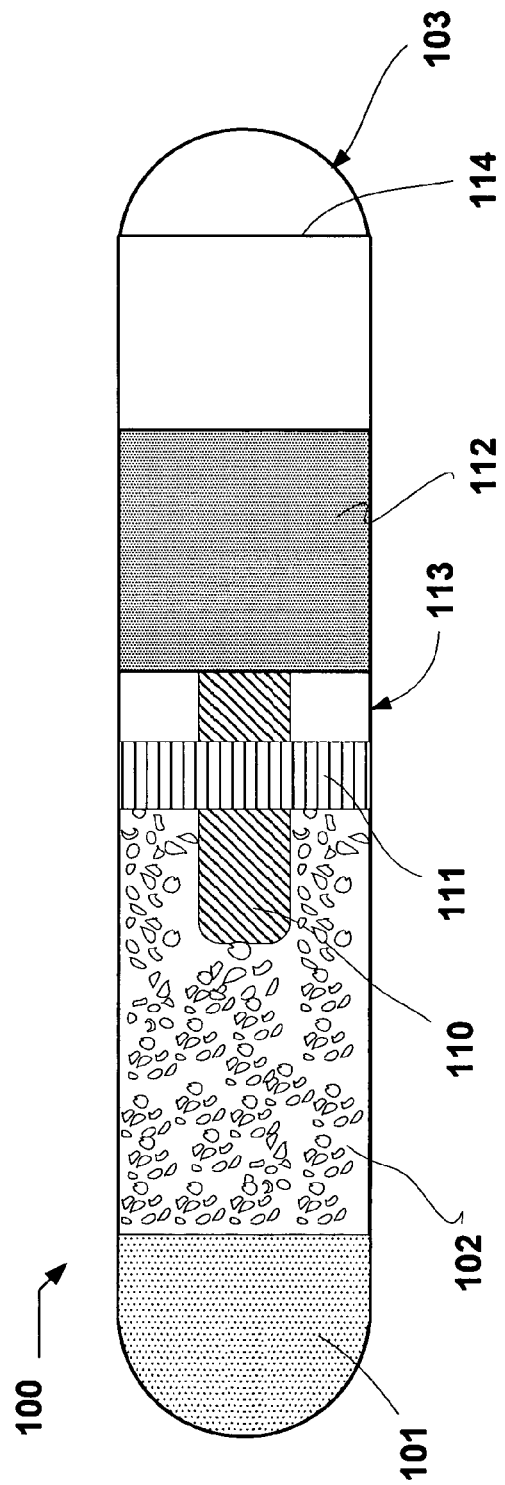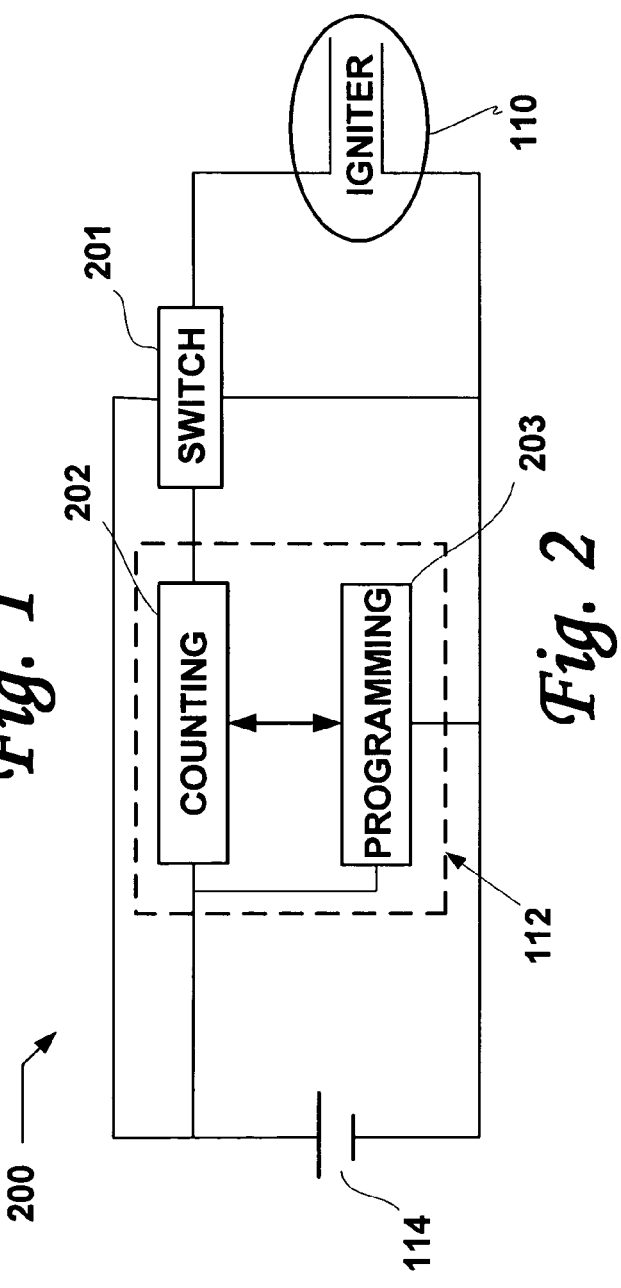
Fig. 1
Fig. 2

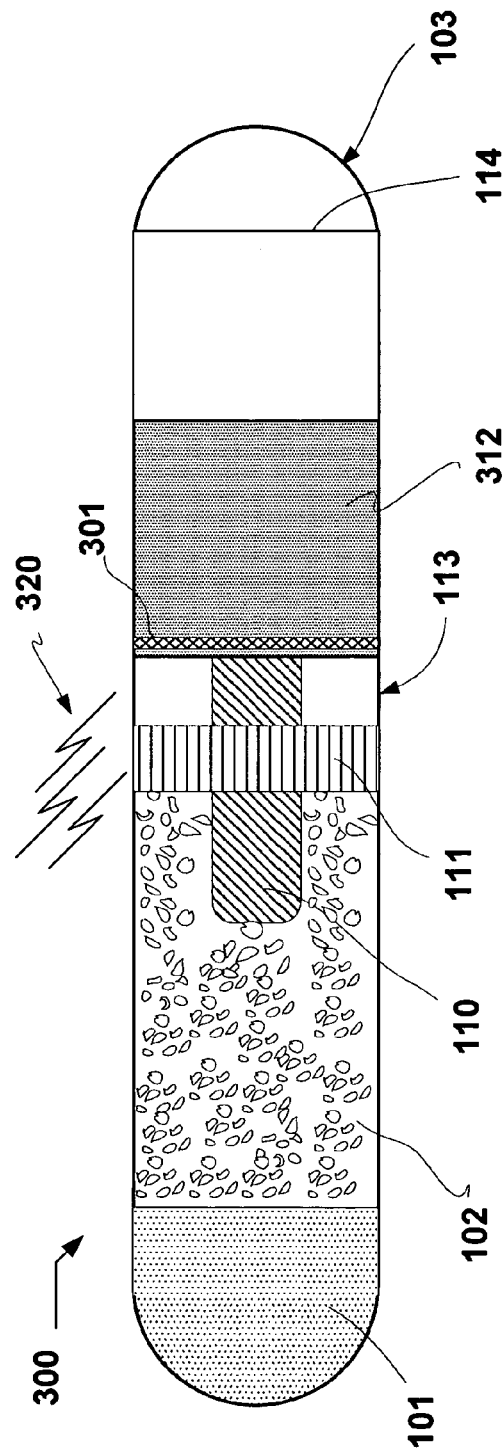
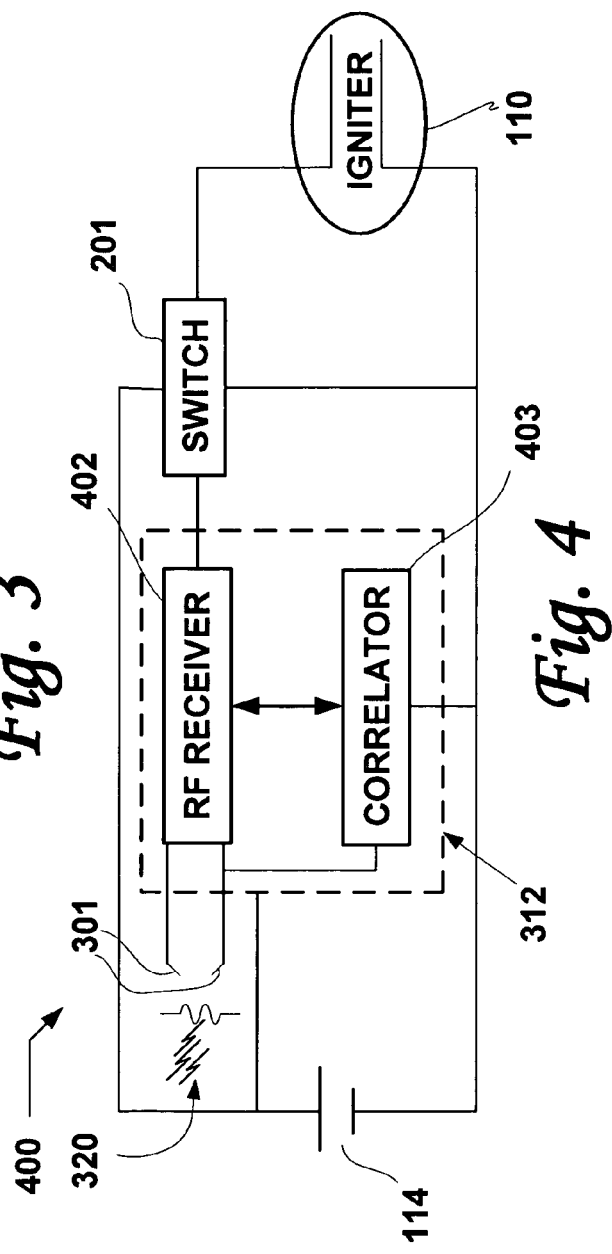

US 7,156,049 B2

RELEASE MECHANISM TO INTERACT WITH BIOTA, IN PARTICULAR FAUNA THAT MAY OUTGROW AVAILABLE HABITAT

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein of any patent granted thereon by the United States. This patent and related ones are available for licensing. Contact Phillip Stewart at 601 634-4113.

BACKGROUND

Triploid grass carp (*Ctenopharyngodon idella*) are sterile fish used to control nuisance aquatic vegetation. This species provides long-term aquatic plant control, e.g., five to seven years, at less cost than either herbicides or mechanical harvesting. One limitation on their use is establishing an optimum stocking level, i.e., too few and the aquatic vegetation is not affected and too many and it is totally eliminated. A second limitation is associated with the latter in that they have a propensity to leave stocking sites, thus impacting desirable vegetation in other locations.

Recently, scientists achieved stocking densities in small impoundments that allowed a targeted level of aquatic plant control. However, achieving desired levels of control in large reservoir systems has been inconsistent. Nevertheless, techniques to age and collect triploid grass carp in large reservoir systems were developed. These techniques allowed scientists to project population trends. The ability to stock and predict subsequent populations of triploid grass carp facilitates achieving optimal populations.

Any carp that migrate may impact native aquatic vegetation in floodplain lakes and in estuaries. In these areas in particular, aquatic plants are needed to keep the natural balance of the environment. Aquatic plants are the primary source of oxygen production in many standing waters as well as providing a protective haven for small fish. In estuaries, these carp may consume native aquatic vegetation required for controlling erosion or needed as nursery habitat for economically important fisheries.

Given the need to optimize population density at stocking sites and to limit potentially damaging effects outside the stocking sites, one control mechanism is ability to limit the life span of these carp. For example, larger fish require more food, thus as they get larger, fewer are needed to maintain the same control of undesirable vegetation. This capability allows resource managers to precisely control population mix and achieve consistency in aquatic plant control in large reservoir systems. Further, this capability limits the time that escaped migrating carp roam freely. Hence, implementing life span control permits introducing triploid grass carp as a suitable management tool for controlling undesirable aquatic vegetation in large impoundments.

BRIEF DESCRIPTION OF THE DRAWINGS

FIG. 1 illustrates a longitudinal cross-section of an embodiment of the present invention.

FIG. 2 is a block diagram of the electronic circuitry used in the embodiment of FIG. 1.

FIG. 3 illustrates a longitudinal cross-section of an alternate embodiment of the present invention.

FIG. 4 is a block diagram of the electronic circuitry used in the embodiment of FIG. 3.

DETAILED DESCRIPTION

Figure 5:
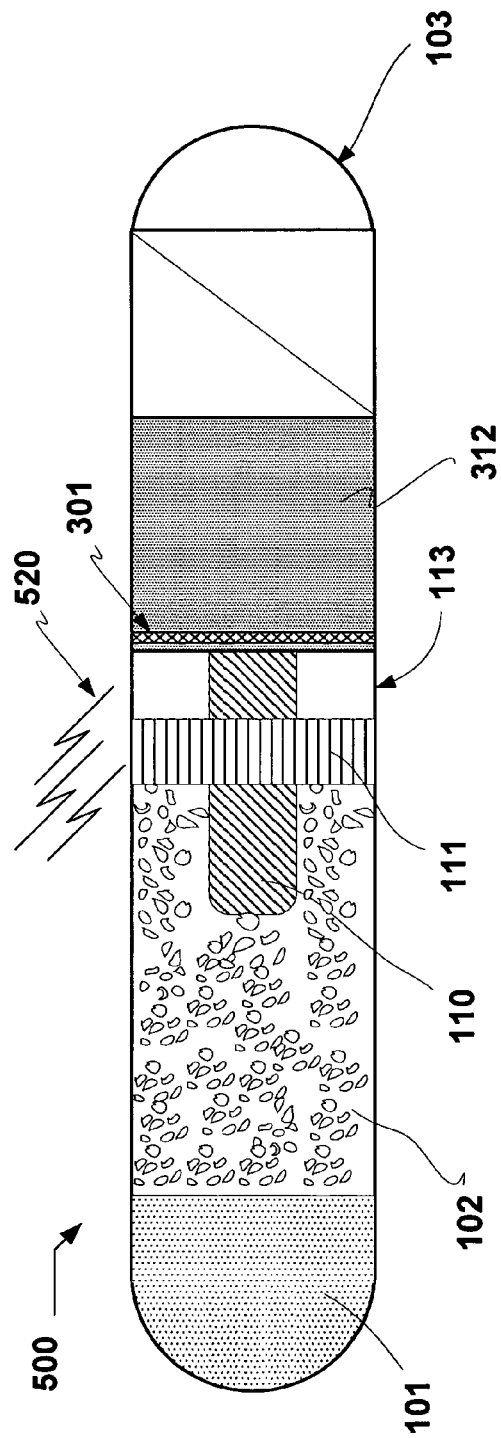
FIG. 5 illustrates a longitudinal cross-section of a second alternate embodiment of the present invention.

An apparatus for delivering a payload to living biota at either a pre-specified time or at a time specified by an observer. In general, it comprises frangible packaging enclosing: means for timing delivery, at least part of the means for programming the apparatus and means for opening the packaging. In select embodiments of the present invention, the apparatus is inserted in fauna, specifically fish. Specific examples of the present invention are implanted in triploid grass carp (*Ctenopharyngodon idella*) to facilitate control of aquatic weeds in bodies of water. When the carp have been in the water for a pre-specified period, ostensibly long enough to effectively control the target aquatic plants, the apparatus dispenses one or more toxins to kill them. Otherwise, the carp may destroy all vegetation and harm the aquatic environment for other aquatic life.

In select embodiments of the present invention, the packaging is a two-part capsule sealed prior to use to yield a leak proof container. The capsule is suitable for retention within living biota, in particular, fish. In select embodiments of the present invention, the apparatus is battery powered, the battery energizing the means for timing, programming, and opening of the capsule. In select embodiments of the present invention, the apparatus is actuated remotely via a pre-specified RF signal.

In select embodiments of the present invention, the means for timing comprises one or more microprocessors, preferably programmable microprocessors. In select embodiments of the present invention, the microprocessor comprises one or more counting circuits communicating with one or more programming circuits.

In select embodiments of the present invention providing remote actuation the means for timing comprises at least an RF receiver in operable communication with a correlator.

In select embodiments of the present invention, the means for programming at least comprises one or more ports to the programming circuit and one or more windows in the packaging, the window being transmissive to one or more range of frequencies in the electromagnetic spectrum. The means for programming enables setting the pre-specified time in the apparatus prior to employment.

In select embodiments of the present invention, the means for opening comprises one or more explosives, one or more igniters adjacent the explosive for energizing the explosive and one or more switches to operate the igniter by making the connection to the battery and the means for timing. In select embodiments of the present invention, energy provided by an RF signal is provided to the igniter with no need for an internal battery.

In select embodiments of the present invention, a system for controlling growth of aquatic plants in a body of water is provided. It comprises at least one triploid grass carp (*Ctenopharyngodon idella*) and means for pre-specifying the life span of the carp. The means for pre-specifying comprise frangible packaging enclosing means for timing delivery of a payload, means for programming a pre-specified time, and means for opening the packaging. The means for controlling the lifespan are inserted in the carp prior to introduction of the carp into a body of water.

In select embodiments of the present invention, the system's payload is one or more toxins. The toxin is encapsulated in one or more two-part capsules that are sealed prior to use to yield a leak proof package suitable for retention by living biota. In select embodiments of the present invention, the system includes a battery in operable communication with the means for timing, programming, and opening. In select embodiments of the present invention, the system uses energy from an RF transmission to activate the means for opening.

In select embodiments of the present invention, the system's means for timing comprises one or more microprocessors, preferably programmable microprocessors. The microprocessor comprises one or more programming circuits suitable for controlling one or more counting circuits. In select embodiments of the present invention, the means for programming further comprises one or more ports to the programming circuit and one or more windows in the packaging. The windows are transmissive to at least one range of frequencies in the electromagnetic spectrum.

In select embodiments of the present invention, the system's means for opening comprise one or more explosives, one or more igniters adjacent the explosive for energizing it and one or more switches in operable communication with the igniter, the battery and the means for timing. In select embodiments of the present invention, energy supplied by the battery is replaced by one or more RF transmissions and may also replace one or more timing means.

In select embodiments of the present invention, a method for delivering one or more payloads to living biota at a pre-specified time comprises:
providing a device for delivering the payload, the device comprising frangible packaging enclosing means for timing delivery of the payload, means for programming a pre-specified period into the means for timing, and means for opening the packaging;
programming the device with a pre-specified time; and
inserting the device into the biota.

In select embodiments of the present invention, a method for delivering one or more payloads to living biota at a pre-specified time comprises:
providing a device for delivering the payload, the device comprising frangible packaging enclosing means for timing delivery of the payload, means for receiving one or more signals, and means for opening the packaging;
programming the device;
inserting the device into the biota; and
transmitting one or more signals to activate the means for receiving signals.

In select embodiments of the present invention, a method for controlling growth of aquatic plants in a body of water comprises:
providing one or more triploid grass carp (*Ctenopharyngodon idella*);
providing means for pre-specifying the life span of the carp, comprising:
frangible packaging enclosing: means for timing delivery of a toxin, means for programming the pre-specified period into the means for timing, and means for opening the packaging;
inserting the means for controlling lifespan into the carp; and
introducing the carp into the body of water.

In select embodiments of the present invention, a method for controlling growth of aquatic plants in a body of water comprises:
providing one or more triploid grass carp (*Ctenopharyngodon idella*);
providing means for pre-specifying the life span of the carp, comprising:
frangible packaging enclosing: means for timing delivery of the payload, means for receiving one or more signals, and means for opening the packaging;
inserting the means for controlling lifespan into the carp;
introducing the carp into the body of water; and
transmitting one or more signals to activate the means for receiving signals.

Select embodiments of the present invention provide a device for terminating biota on a pre-specified schedule, in particular fauna, and more particularly fish. An embodiment of the present invention is adapted to be incorporated into biota and comprises a container, such as a capsule, enclosing a toxin. An embodiment of the present invention comprises means within the container for automatically releasing its contents after a pre-specified time, releasing one or more toxins into vital areas of the biota, e.g., blood vessels of fish. Another embodiment of the present invention comprises alternate means within the container for releasing its contents upon receipt of a remotely activated signal instead of at a pre-specified time.

An embodiment of the present invention also provides a method for terminating biota, in particular fauna, on a pre-specified schedule. One embodiment of the method of the present invention comprises emplacing a payload-containing capsule within the fauna. The container is programmed to automatically release the payload after a pre-specified period. An example of this would be surgically inserting a toxin-containing capsule into a fish, such as a triploid grass carp, having programmed the capsule to rupture after a pre-specified period or upon receipt of a remotely activated signal. Upon rupture, the capsule introduces one or more toxins into the bloodstream of the carp.

EXAMPLE I

Refer to FIG. 1 showing an example device 100 that may be used in an embodiment of the present invention. The device 100 comprises a two-part capsule 103 of thin frangible material, the two parts joined by a circumferential seal 111. The sealed capsule 103 is adapted to be placed within an appropriate location in biota, e.g., the body tissue of a fish. The device 100 contains a payload 101, such as a lethal dose of a suitable toxin, and means for automatically opening the capsule 103 after a pre-specified time to release the payload 101.

Refer to FIG. 2. A variety of opening means may be used. A circuit diagram 200 enabling one such means is shown in FIG. 2. One embodiment of the present invention envisions an explosive 102 for delivering a payload 101 by rupturing the capsule 103, an igniter 110 disposed to contact the explosive 102, a thin film battery 114 in operable communication with the igniter 110, a normally open switch 201 in operable communication between the battery 114 and the igniter 110, and a microprocessor 112 connected to the switch 201. The microprocessor 112 contains a counting circuit 202 and a programming circuit 203 for controlling the counting circuit 202. The microprocessor 112 has a non-contact programming port (not shown separately) that is accessed through a programming window 113 in the capsule 103. This facilitates programming changes and extends shelf life by inhibiting the counting mechanism 202 until the device 100 is to be emplaced. The size of the capsule 103 depends upon the application being addressed.

In operation of an embodiment of the present invention, the device 100 is programmed to open at a pre-specified time by programming the microprocessor 112 through the programming window 113 of the capsule 103. The device 100 may then be emplaced, e.g., injected into a fish and the counter begins its count down cycle. At the programmed time, the microprocessor 112 closes the switch 201 and the battery 114 initiates the igniter 110. The igniter 110 detonates the explosive 102, fracturing the capsule 103 and releasing the payload 101. In one embodiment of the present invention one or more toxins are released to enter the blood stream of a fish.

EXAMPLE II

Refer to FIG. 3 showing an example device 300 that may be used in an embodiment of the present invention. The device 300 comprises a two-part capsule 103 of thin frangible material, the two parts joined by a circumferential seal 111. The sealed capsule 103 is adapted to be placed within an appropriate location in biota, e.g., the body tissue of a fish. The device 300 contains a payload 101, such as a lethal dose of a suitable toxin, and means for automatically opening the capsule 103 at receipt of a pre-specified signal to release the payload 101.

A variety of opening means may be used. A circuit diagram 400 enabling one such means is shown in FIG. 4. One embodiment of the present invention envisions an explosive 102 for delivering a payload 101 by rupturing the capsule 103, an igniter 110 disposed to contact the explosive 102, a thin film battery 114 in operable communication with the igniter 110, a normally open switch 201 in operable communication between the battery 114 and the igniter 110, and a microprocessor 312 connected to the switch 201, and an antenna 301. The microprocessor 312 contains an RF receiver 402 and a correlator circuit 403 for controlling the receiver 402. The microprocessor 312 has a non-contact programming port (not shown separately) that is accessed through a programming window 113 in the capsule 103. This facilitates programming changes and permits using a smaller battery 110 by inhibiting the correlator circuit 403 until the device 300 is to be energized by a pre-specified signal 320, such as an RF signal similar to that used with garage door openers, but operating at a lower frequency.

In operation of an embodiment of the present invention, the device 300 is programmed to open at receipt of the pre-specified signal 320 by programming the microprocessor 312 through the programming window 113 of the capsule 103. The device 300 may then be emplaced, e.g., injected into a fish and energized at an appropriate time. For example a wildlife biologist determines a grass carp has met objectives for aquatic weed control and initiates the signal 320. At the receipt of the pre-specified signal 320 at the antenna 301, the signal 320 is fed to the microprocessor 312 which closes the switch 201 and the battery 114 initiates the igniter 110. The igniter 110 detonates the explosive 102, fracturing the capsule 103 and releasing the payload 101. In one embodiment of the present invention one or more toxins are released as the payload 101 to enter the blood stream of a fish.

EXAMPLE III

Refer to FIG. 5 showing an example device 500 that may be used in an embodiment of the present invention. The device 500 comprises a two-part capsule 103 of thin frangible material, the two parts joined by a circumferential seal 111. The sealed capsule 103 is adapted to be placed within an appropriate location in biota, e.g., the body tissue of a fish. The device 500 contains a payload 101, such as a lethal dose of a suitable toxin, and means for automatically opening the capsule 103 at receipt of a pre-specified signal to release the payload 101.

Figure 6:
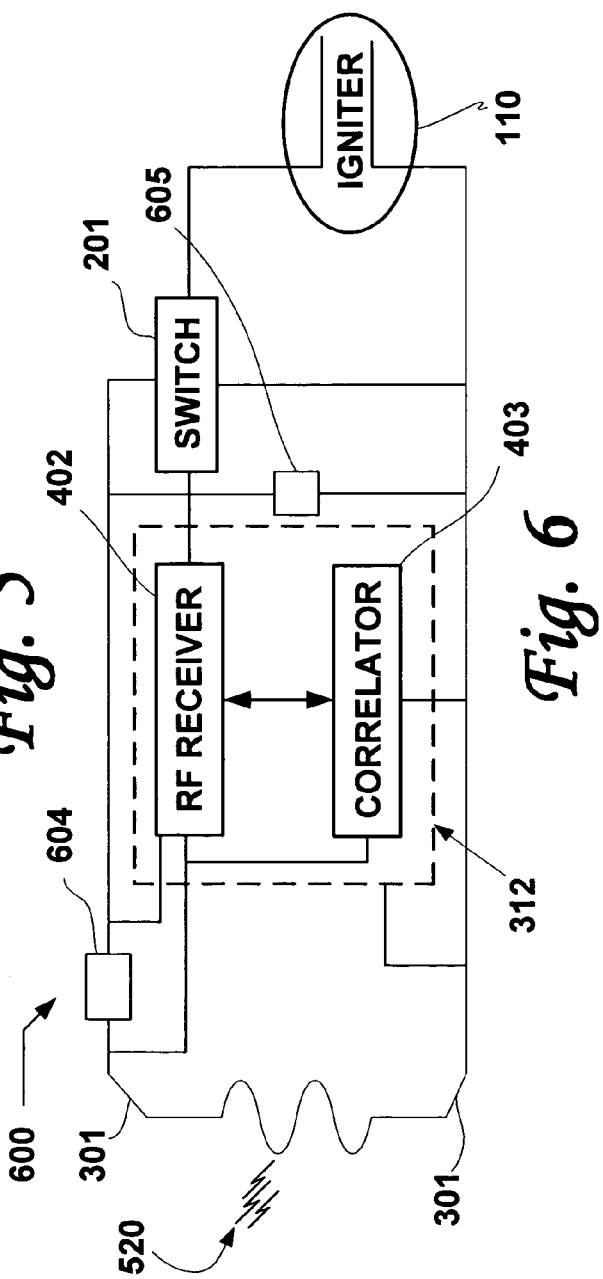
FIG. 6 is a block diagram of the electronic circuitry used in the embodiment of FIG. 5.

A variety of opening means may be used. A circuit diagram 600 enabling one such means is shown in FIG. 6. One embodiment of the present invention envisions an explosive 102 for delivering a payload 101 by rupturing the capsule 103, an igniter 110 disposed to contact the explosive 102, in operable communication with a switch 201 and the igniter 110, a normally open switch 201 in operable communication with an AC-DC converter 604 and a charge bank 605, the RF receiver 402 and the igniter 110, and an antenna 301 in operable communication with the AC-DC converter 604. The microprocessor 312 contains an RF receiver 402 and a correlator circuit 403 for communicating with the receiver 402. The microprocessor 312 has a non-contact programming port (not shown separately) that is accessed through a programming window 113 in the capsule 103. This facilitates programming changes and permits using a strong signal to provide the energy needed to correlate the received signal to the programmed pre-specified signal 520 prior to closing the switch 201 and energizing the igniter 110. Alternatively, the device 500 may be programmed (pre-set) at the factory to recognize a pre-specified signal, eliminating the need for programming in the field. The "high-amplitude" signal 520 may be an RF signal similar to that used with garage door openers, but operating at a lower frequency.

In operation of an embodiment of the present invention, the device 500 is programmed to open at receipt of the pre-specified high-amplitude signal 520 by programming the microprocessor 312 through the programming window 113 of the capsule 103 or pre-setting the microprocessor at the factory. The device 500 may then be emplaced, e.g., injected into a fish, and energized at an appropriate time. For example a wildlife biologist determines a grass carp has met objectives for aquatic weed control and initiates the signal 520. At the receipt of the pre-specified signal 520 at the antenna 301, conversion by the AC-DC converter 604 and charging of the charge bank 605, the microprocessor 312 closes the switch 201 and energizes the igniter 110 by discharging the charge bank 605 across the igniter. The igniter 110 detonates the explosive 102, fracturing the capsule 103 and releasing the payload 101. In one embodiment of the present invention one or more toxins are released as the payload 101 to enter the blood stream of a fish.

Accordingly, all such modifications are intended to be included within the scope of this invention as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The abstract is provided to comply with the rules requiring an abstract, which will allow a searcher to quickly ascertain the subject matter of the technical disclosure of any patent issued from this disclosure. 37 CFR § 1.72(b). Any advantages and benefits described may not apply to all embodiments of the invention.

We claim:

1. A pill-sized insert small enough to be inserted into living animals, said apparatus suitable for interacting one time with said living animals at a pre-specified extended time after insertion of said apparatus into said living animals, comprising:
   frangible packaging;
   a programmable microprocessor for timing delivery of a payload in a one-time event entirely within said animals;
   wherein said microprocessor and said payload are enclosed within said packaging, and wherein said microprocessor comprises at least one counting circuit and at least one programming circuit in operable communication with at least said counting circuit;
   means for programming said pre-specified period into said microprocessor, said
   means for programming in operable communication with said microprocessor,
   wherein said at least part of said means for programming is enclosed within said packaging;
   means for opening said packaging in operable communication with at least said microprocessor,
   wherein said means for opening is enclosed within said packaging in which said means for opening comprises:
      at least one battery in operable communication with at least said microprocessor,
      said means for programming, and said means for opening, at least one explosive;
      at least one igniter, in operable communication with said explosive, for energizing said explosive; and
      at least one switch in operable communication with at least said igniter, said battery and said microprocessor.

2. The apparatus of claim 1 in which said means for programming at least comprises:
   at least one window in said packaging, said window transmissive to at least one range of frequencies in the electromagnetic spectrum; and
   at least one port to said programming circuit,
   wherein said means for programming enables at least setting said pre-specified time in said apparatus.

3. A system inserted in at least one triploid grass carp (*Ctenopharyngodon idella*), said carp to be used for controlling growth of aquatic plants in a body of water, comprising:
   means for pre-specifying the life span of said carp, comprising:
      frangible packaging;
      at least one programmable microprocessor for timing delivery of a payload;
   wherein said microprocessor comprises at least one counting circuit and at least one programming circuit in operable communication with said counting circuit, and
   wherein said microprocessor and said payload are enclosed within said packaging;
      means for programming said pre-specified life span into said microprocessor; and
      means for opening said packaging in operable communication with said microprocessor,
   wherein said means for opening is enclosed within said packaging.

4. The system of claim 3 in which said means for programming at least comprises:
   at least one window in said packaging, said window transmissive to at least one range of frequencies in the electromagnetic spectrum; and
   at least one port to said programming circuit,
   wherein said means for programming enables at least setting said pre-specified life span in said system.

5. The system of claim 3 in which said means for opening comprises at least:
   at least one battery in operable communication with at least said microprocessor, said means for programming, and said means for opening at least one explosive;
   at least one igniter in operable communication with said explosive, for energizing said explosive; and
   at least one switch in operable communication with said igniter, said battery and means for timing.

6. A method for controlling growth of aquatic plants in a body of water by utilizing at least one triploid grass carp (*Ctenopharyngodon idella*), comprising:
   providing means for pre-specifying the life span of said carp, comprising:
      frangible packaging;
      means for timing delivery of a toxin;
   wherein said means for timing and said toxin are enclosed within said packaging; and
      means for programming said pre-specified life span into said means for timing,
   wherein at least part of said means for programming is enclosed within said packaging;
      means for rupturing said packaging in operable communication with at least said means for timing,
   wherein said means for rupturing is enclosed within said packaging;
   inserting said means for pre-specifying the life span into said carp; and
   introducing said carp into said body of water.

* * * * *